Patented Feb. 13, 1951

2,541,091

UNITED STATES PATENT OFFICE 2,541,091

ETHERS OF 1-HALOGEN, 2-METHYL, 4-HYDROXYBUTENE-2

William Oroshnik, Brooklyn, N. Y., assignor to Ortho Pharmaceutical Corporation, a corporation of New Jersey No Drawing. Application December 8, 1945, Serial No. 633,873

8 Claims. (Cl. 260—614)

This invention relates to novel compounds and to methods and steps in the methods for preparing the same. More particularly, this invention relates to various derivatives of isoprene and to methods for producing them. In one of its specific aspects, this invention is directed to the ethers of the halohydrins of isoprene and especially of the 1,4 halohydrins of isoprene and the 1,2 halohydrins of isoprene. This application is a continuation in part of my copending application, Serial No. 617,666, filed September 20, 1945, now abandoned.

According to this invention, various derivatives of isoprene may be readily and easily produced. These various products find application in a number of different fields, and especially as reactants with other products to produce a wide variety of heretofore unknown and useful products. One class of compounds with which this invention is particularly concerned includes the ethers of the 1,4 halohydrins of isoprene. These compounds are particularly useful in the preparation of ethers having vitamin A activity as set forth in my copending application, Serial No. 617,666, filed on September 20, 1945, and hereby made part hereof. These novel ethers of the 1,4 halohydrins of isoprene have the following general formula:

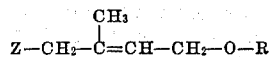

in which Z represents any halogen and R represents any hydrocarbon group and preferably any hydrocarbon alkyl, aryl, alkaryl or aralkyl group, examples of which are methyl, ethyl, butyl, hexyl, octadecyl, phenyl, naphthyl, para ethyl phenyl, cresyl, tertiary butyl phenyl, benzyl, phenyl ethyl, phenyl propyl etc. groups.

Another class of compounds with which this invention is concerned are the ethers of the 1,2 halohydrins of isoprene having the following general formula:

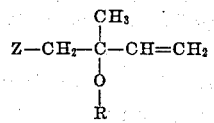

in which Z and R have the significances as before defined.

A general method for preparing said ethers is as follows: A quantity of isoprene is dissolved in a large excess of a primary or secondary alcohol or a phenol containing a small amount of a strongly acidic agent such as p-toluenesulfonic acid, stannic chloride, sulphuric acid, etc. which acts as a catalyst. The alcohol or phenol employed depends upon the hydrocarbon radical which is to be coupled with the isoprene through an oxygen atom, for example, methanol is employed when a methyl ether is desired, phenol is employed when a phenyl ether is desired, etc. To the said solution is added an agent capable of yielding a hypohalous acid under these conditions. An example of a class of one of said agents is the alkylesters of hypochlorous acid such as tertiary butyl hypochlorite. This mixture is allowed to react. After reaction has taken place, the products are isolated and separated from each other by distillation.

For the purposes of illustration, I shall hereinafter set forth Examples I to III in order to show the methods for preparing illustrative examples of some of the ethers of the 1,4 halohydrins of isoprene and also the 1,2 halohydrins of isoprene. These examples are set forth by way of illustration and not limitation.

*Example I*

600 grams of isoprene are dissolved in 1600 ccs. of absolute methanol containing 50 grams of p-toluenesulfonic acid. This solution, by any appropriate means, is maintained between about 0° C. and 20° C. and while in this temperature range, it is stirred vigorously and 829 grams of tertiary butyl hypochlorite is slowly added thereto in equal small increments over a two-hour period. After the completion of this addition, the mixture is stirred for one-half hour at room temperature and then is poured into a large volume of water whereupon an oily mass separates out. To this mixture is added ethyl ether, the mixture is vigorously agitated in order to extract with said ether as much as possible of the oily mass from the aqueous portion thereof. This mix is now allowed to settle into two main layers, an ether layer and an aqueous layer. The aqueous layer may then be separated from the ether layer and is discarded. The remaining ether solution is washed several times with water and finally with sodium bicarbonate solution. The washed ether solution is then dried with anhydrous potassium carbonate. The drying agent is filtered off and the filtrate is distilled whereby the bulk of the ether solvent is removed. The remaining liquid may be fractionally distilled under a vacuum of 55 mm. of mercury pressure and the following products are obtained and recovered as separate fractions:

Fraction I measures 350 grams, has a boiling point of 68° C. to 70° C. at 55 mm. of mercury pressure, an index of refraction at 25° C. of 1.4430 and is 1-chloro-2-methyl-2-methoxy-butene-3 having the following general formula:

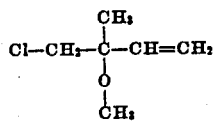

Fraction II measures 279 grams, has a boiling point of 89° C. to 91° C. at 55 mm. of mercury pressure, an index of refraction at 27° C. of 1.4608 and is 1 - chloro - 2 - methyl - 4 - meth - oxybutene-2, having the following chemical formula:

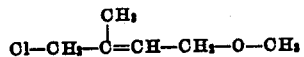

*Example II*

140 grams of isoprene are dissolved in 800 ccs. of dried butanol containing 10 grams of p-toluenesulfonic acid. The temperature of this solution, by any convenient means is raised to 30° C. and while being maintained at this temperature and being constantly stirred, there is slowly added thereto, 200 grams of tertiary butyl hypochlorite in equal small increments over a period of about three hours. After this addition has been completely made, the mixture is stirred for two hours at room tmperature. Then there is added thereto 50 grams of finely powdered anhydrous potassium carbonate. When the p-toluenesulfonic acid has been completely neutralized, the mixture is filtered and the filtrate is recovered. The filtrate is distilled under vacuum whereby the bulk of the butanol therein is removed. The residue is further distilled under vacuum of 12 mm. of mercury pressure, through a fractionating column and the following fractions are obtained and separately recovered:

Fraction I measures 70 grams, has a boiling point of 76° C. to 78.5° C. at 12 mm. of mercury pressure, has an index of refraction at 23° C. of 1.4428 and is 1-chloro-2-methyl-4-butoxybutene-3, having the following general formula:

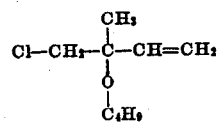

Fraction II measures 68 grams, has a boiling point of 101° C. to 102.5 C. at 12 mm. of mercury pressure, has an index of refraction at 24° C. of 1.4555 and is 1-chloro-2-methyl-4-butoxybutene-2, having the following general formula:

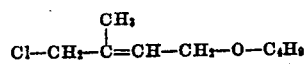

*Example III*

300 grams of isoprene are dissolved in 1,000 ccs. of anhydrous ethyl alcohol. Into this solution is dissolved 25 grams of paratoluenesulfonic acid. The temperature of this solution, by any convenient means, is maintained between −30° C. to −60° C. and while being maintained at this temperature and being constantly stirred, there is added dropwise thereto, 432 grams of tertiary butyl hypochlorite. This addition takes about two hours. The stirring is continued for an additional half hour and then the mixture is allowed to come to room temperature. Subsequently the mixture is poured into a large volume of water or sodium chloride solution, whereupon an oily mass separates out. To this mixture is added an ethyl ether which extracts the oily mass from the aqueous portion of the mixture. The ether solution is separated from the aqueous constituent, then thoroughly washed with water and finally with a sodium bicarbonate solution. It is then dried over anhydrous potassium carbonate and filtered, and the ether is then distilled off. The residue is fractionally distilled under vacuum and the following products are obtained and recovered as separate fractions.

Fraction I measures 150 grams, has a boiling point of 69° C. to 70° C. at 56 mm. of mercury pressure, an index of refraction at 20° C. of 1.4412 and is 1-chloro-2-ethoxy-2-methyl-butene-3, having the following general formula:

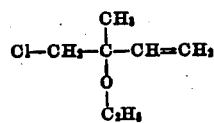

Fraction II measures 119 grams, has a boiling point of 96° C. to 98° C. at 48 mm. of mercury pressure, an index of refraction at 20° C. of 1.4636 and is 1-chloro-2-methyl-4-ethoxy-butene-2, having the following general formula:

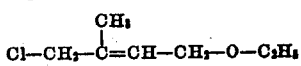

The ethers of the 1,4 halohydrins of isoprene may be reacted with an acetylide such as sodium, potassium, lithium or calcium acetylide to produce compounds having the following general formula:

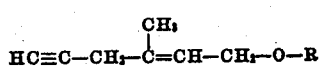

in which R has the same significance as before defined. These resultant compounds may be reacted with a Grignard reagent, such as an alkyl metal halide, to produce compounds having the following general formula:

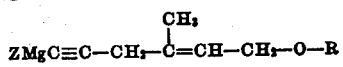

in which Z and R have the significance as before defined.

These last resultant novel compounds may be employed in the manner set forth in my copending application Serial No. 617,666, filed September 20, 1945, and made part hereof. Besides being employed for the production of the aforesaid compounds, novel ethers of the 1,4 halohydrins of isoprene may also be employed:

(a) For the synthesis of compounds containing two or more isoprene units in their carbon skeletons; (b) for the production of the type,

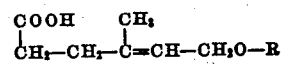

in which R has the same signifiance as before defined, which may be produced by reacting one of said ethers with sodium salt of malonic or acetoacetic ester and finally hydrolyzing; (c) for the production of ketones of the type,

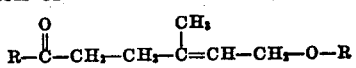

in which R has the same significance as before defined, produced by employing the acetoacetic ester synthesis; (d) for the synthesis of amines of the type,

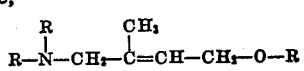

in which R may be hydrogen or may have the same signifiance as before defined, which may be used for the production of quaternary ammonium salts.

The novel ethers of the 1,2 halohydrins of isoprene may be used for a number of different purposes in a wide variety of fields. They may be employed as intermediates in further chemical syntheses or may be employed as a finished product. In the latter category they find use as solvents, plasticizers and general outlet as organic liquids. As intermediates, they may be employed in the following manner: (1) They may be reacted with ammonia to provide primary, secondary, and tertiary amines. In the last instance, they form a quaternary ammonium salt. (2) They may be reacted with the metal derivatives of acetoacetic ester or other B-keto esters, or in general, the metal derivatives of any compound having an active methylene group. In such reactions there are produced new ketones and new carboxylic acids which in turn may be used as chemical intermediates in further syntheses. (3) They may be dehalogenated to provide the ethers dimethyl vinyl carbinol. (4) Both the halogen and the ether groups may be hydrolyzed to provide vinyl methyl ethylene glycol.

Since certain changes in carrying out the above process and certain modifications in the compositions which embody the invention may be made without departing from its scope, it is intended that all matter contained in the description shall be interpreted as illustrative and not in a limiting sense.

I claim:
1. The method for producing a compound of the formula

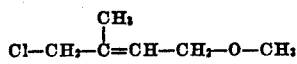

comprising reacting in the presence of an acidic agent and under anhydrous conditions a mixture of isoprene, tertiary butyl hypochlorite and methanol.

2. An ether of a 1,4 halohydrin of isoprene, having the following general formula:

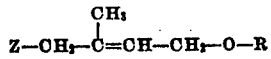

in which Z is a halogen and R is selected from the group consisting of alkyl, aryl, and aralkyl radicals.

3. An ether of a 1,4 halohydrin of isoprene, having the following general formula:

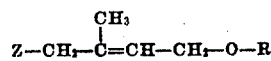

in which Z is a halogen and R is an alkyl group.

4. An ether of the 1,4 chlorohydrin of isoprene having the following general formula:

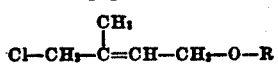

in which R is selected from the group consisting of alkyl, aryl, and aralkyl radicals.

5. An ether of the 1,4 chlorohydrin of isoprene having the following general formula:

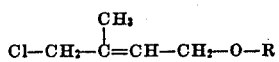

in which R is an alkyl group.

6. An ether of the 1,4 halohydrin of isoprene having the following general formula:

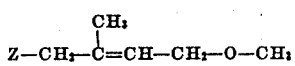

in which Z is a halogen.

7. An ether of the 1,4 chlorohydrin of isoprene having the following general formula:

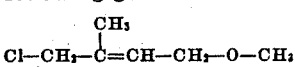

8. The method comprising reacting in the presence of an acidic agent and under anhydrous conditions a mixture of isoprene, a lower alkyl hypohalite, and a compound having the formula ROH in which R is selected from the group consisting of alkyl, aryl, and aralkyl radicals to provide a compound having the following formula:

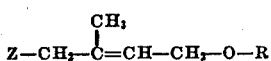

in which Z is a halogen and R has the same significance as above.

WILLIAM OROSHNIK.

REFERENCES CITED

The following references are of record in the file of this patent:

UNITED STATES PATENTS

| Number | Name | Date |
|---|---|---|
| 2,075,312 | Straus | Mar. 30, 1937 |
| 2,107,789 | Harford | Feb. 8, 1938 |
| 2,207,983 | Harford | July 16, 1940 |

FOREIGN PATENTS

| Number | Country | Date |
|---|---|---|
| 590,432 | Germany | Jan. 5, 1934 |

OTHER REFERENCES

Ingold et al.: "Chemical Society Journal Proceedings" (London), Part 2, pages 2752 to 2765 (1931).

American Chemical Abstracts, volume 38, page 3248[3] (1944).

Petrov: "Journal General Chem.," U. S. S. R., vol. 8 (1938), pages 131–140. Abstracted in 32 Chem. Abs. 5369.

Petrov: "Journal Gen. Chem.," U. S. S. R., vol. 8 (1938), pages 208–215. Abstracted in 32 Chem. Abstracts 5369.

Irvin et al.: "Jour. Am. Chem. Soc.," vol. 63 (1941), pages 858–860.